United States Patent
Parsons et al.

(10) Patent No.: US 10,670,021 B2
(45) Date of Patent: Jun. 2, 2020

(54) CONTROL OF CLUTCHED DEVICE USING MAGNETIC FORCE FROM MOTOR

(71) Applicant: Litens Automotive Partnership, Woodbridge (CA)

(72) Inventors: Scott D. Parsons, Toronto (CA); Gary J. Spicer, Mississauga (CA); Roman Tracz, Mississauga (CA)

(73) Assignee: Litens Automotive Partnership, Woodbridge (CA)

( * ) Notice: Subject to any disclaimer, the term of this patent is extended or adjusted under 35 U.S.C. 154(b) by 387 days.

(21) Appl. No.: 15/110,923

(22) PCT Filed: Jan. 12, 2015

(86) PCT No.: PCT/CA2015/000017
§ 371 (c)(1),
(2) Date: Jul. 11, 2016

(87) PCT Pub. No.: WO2015/103696
PCT Pub. Date: Jul. 16, 2015

(65) Prior Publication Data
US 2016/0341203 A1    Nov. 24, 2016

Related U.S. Application Data

(60) Provisional application No. 61/926,255, filed on Jan. 10, 2014, provisional application No. 61/929,011, (Continued)

(51) Int. Cl.
*F04D 15/00* (2006.01)
*F16D 27/105* (2006.01)
(Continued)

(52) U.S. Cl.
CPC ....... *F04D 15/0027* (2013.01); *F16D 27/105* (2013.01); *F16D 41/206* (2013.01);
(Continued)

(58) Field of Classification Search
CPC .... F04D 15/0027; F04D 13/022; F04D 1/025; F04D 13/06; F04D 15/0066; F01P 3/20;
(Continued)

(56) References Cited

U.S. PATENT DOCUMENTS 5,265,707 A * 11/1993 Abe ..................... F16D 41/088
192/30 W
8,166,945 B2    5/2012 Spicer et al.
(Continued)

FOREIGN PATENT DOCUMENTS

CN    102575562 A    7/2012
CN    103180629 A    6/2013
(Continued)

OTHER PUBLICATIONS

The working principles of one-way clutch, chinasunna.com/new_detail/nid/3422.htnnl (Year: 2014).*
(Continued)

*Primary Examiner* — Patrick Hamo
*Assistant Examiner* — David N Brandt
(74) *Attorney, Agent, or Firm* — Millman IP Inc.

(57) ABSTRACT

In an aspect, a clutched device is provided, and includes an input member, an output member, a one-way clutch that can operatively connect the input member to the output member, and a motor including a stator and a rotor. The rotor is connected for rotation with a portion of the one-way clutch. The stator is operable to apply a first magnetic driving force to cause movement of the portion of the one-way clutch in a first rotational direction to increase a force of engagement between the input and output members. The stator is operable to apply a second magnetic driving force to cause movement of the portion of the one-way clutch to disengage the input and output members from each other.

12 Claims, 12 Drawing Sheets

Related U.S. Application Data filed on Jan. 17, 2014, provisional application No. 61/975,485, filed on Apr. 4, 2014, provisional application No. 61/976,705, filed on Apr. 8, 2014, provisional application No. 61/981,911, filed on Apr. 21, 2014, provisional application No. 62/006,396, filed on Jun. 2, 2014.

(51) Int. Cl.

| | | |
|---|---|---|
| *F16D 41/20* | (2006.01) | |
| *F16D 47/04* | (2006.01) | |
| *F01P 3/20* | (2006.01) | |
| *F04D 1/02* | (2006.01) | |
| *B60K 25/02* | (2006.01) | |
| *F16H 7/02* | (2006.01) | |
| *F02B 67/06* | (2006.01) | |
| *F01P 5/12* | (2006.01) | |

(52) U.S. Cl.
CPC ........ *F16D 47/04* (2013.01); *B60K 2025/022* (2013.01); *F01P 3/20* (2013.01); *F01P 5/12* (2013.01); *F02B 67/06* (2013.01); *F04D 1/025* (2013.01); *F05B 2240/30* (2013.01); *F16H 7/02* (2013.01)

(58) Field of Classification Search
CPC ........ F01P 5/12; F16D 41/206; F16D 27/105; F16D 47/04; F16D 1/00; F05B 2240/30; B60K 2025/022; F16H 7/02; F02B 67/06
See application file for complete search history.

(56) References Cited

U.S. PATENT DOCUMENTS

| | | | |
|---|---|---|---|
| 8,387,767 | B2 | 3/2013 | Komorowski et al. |
| 8,677,963 | B2 | 3/2014 | Stolz-Douchet et al. |
| 2002/0083905 | A1 | 7/2002 | Kim |
| 2010/0122882 | A1* | 5/2010 | Komorowski ........ F16D 27/105 192/35 |
| 2011/0123365 | A1 | 5/2011 | Buchholz et al. |
| 2013/0049919 | A1 | 4/2013 | Boyes et al. |
| 2013/0206005 | A1 | 11/2013 | Shutty |
| 2013/0306005 | A1 | 11/2013 | Shutty et al. |
| 2013/0313068 | A1* | 11/2013 | Mevissen ............... B60K 25/00 192/81 C |
| 2014/0023527 | A1 | 1/2014 | Roby |

FOREIGN PATENT DOCUMENTS

| | | |
|---|---|---|
| CN | 103403380 A | 11/2013 |
| CN | 103477119 A | 12/2013 |
| GB | 2444948 A | 6/2008 |
| JP | 2007285268 A | 11/2007 |
| JP | 2014013010 A | 1/2014 |
| KR | 10-2010-006392 | 5/2011 |
| KR | 101427089 B1 | 7/2014 |
| WO | 2012024790 A3 | 3/2012 |
| WO | 2012147510 A1 | 11/2012 |
| WO | 20130049919 A1 | 4/2013 |
| WO | 2013152430 A1 | 10/2013 |

OTHER PUBLICATIONS

Comments on the Communication under Rule 71(3) for EP15735426.7 dated Jul. 13, 2018.
OA for CN201580003980.3 dated Apr. 3, 2018.
OA for CN201580003980.3 dated Apr. 3, 2018—English translation.
Aculon Surface Modification Technology, Aculon.
Aerotec DC Ring Torque Hub Motors—Product Catalog—Rotary Motors, Aerotec, 2014.
Aerotec DC Ring Torquw Hub Motors—S-Series, Aerotec.
Applimotion LARC—12VDC Linear Arc Motors, Applimotion Inc., 2014.
Applimotion ULT—12VDC Frameless Ring Motors, Applimotion Inc., 2014.
Applimotion UTS—12 VDC @ 64 oz-in Torque, Applimotion Inc., 2014.
Applimotion UTS—12VDC Frameless Ring Motors, Applimotion Inc., 2014.
Hydrophobicity Presentation, Gelest, Inc., 2006.
International Search Report for PCT/CA2015/000017, dated Mar. 9, 2015.
Miniature EM Coils, McMaster Carr, 2014.
Office Action for CN201580003980 dated Feb. 3, 2019.

\* cited by examiner

| Mode | Pulley speed (RPM) | Electric Motor (RPM) | SWP | 1-way clutch | Radial Impeller (RPM) | Axial Impeller (RPM) |
|---|---|---|---|---|---|---|
| Idle stop | 0 | 1000 | Disengaged | Overrun | 1000 | 0 |
| Conventional | 5000 | Off | Engaged | Locked | 5000 | 5000 |
| Warm up | 2000 | Off | Disengaged | n/a | 0 | 0 |
| Variable speed | 3000 | 1500 | Disengaged | Overrun | 1500 | 0 |

FIG 12

CONTROL OF CLUTCHED DEVICE USING MAGNETIC FORCE FROM MOTOR

CROSS-REFERENCE TO RELATED APPLICATIONS

This application claims the benefit of U.S. Provisional Application No. 61/926,255, filed Jan. 10, 2014, U.S. Provisional Application No. 61/929,011 filed Jan. 17, 2014, U.S. Provisional Application No. 61/975,485 filed Apr. 4, 2014, U.S. Provisional Application No. 61/976,705 filed Apr. 8, 2014, U.S. Provisional Application No. 61/981,911, filed Apr. 21, 2014, and U.S. Provisional Application No. 62/006,396 filed Jun. 2, 2014, the contents of all of which are incorporated herein by reference in their entirety.

FIELD OF DISCLOSURE

This disclosure relates generally to the field of accessories that are driven by a belt or other endless drive member from an engine, and more specifically water pumps that are driven by a belt or other endless drive member from an engine.

BACKGROUND OF DISCLOSURE

In conventional internal combustion engine arrangements in use today, fixed drive mechanical water pumps are currently commonly used to pump coolant through the engine so as to prevent overheating of the engine. In such arrangements, drive power from the engine is transferred from the engine crankshaft via a crankshaft pulley to several accessories (including a water pump) via an endless drive member, such as a Poly-V or multi-ribbed rubber drive belt. Typically, the speed of the belt-driven water pump (i.e. the speed of the water pump's impeller) is directly related to the speed of the engine due to their connection via the accessory drive belt.

It is known that engine cooling requirements vary depending on many factors, including the engine load and the speed of the vehicle. Typically, a fixed drive water pump as described above must be designed to cool the engine sufficiently under the worst conditions such as a situation in which the engine is at low RPM, at high engine load, and at low vehicle speed). However, due to the fixed connection between the water pump and the engine, this means that in many situations the amount of cooling supplied by the pump is more than is necessary.

Such a situation robs the engine unnecessarily of power, which means that the engine must make more power than would otherwise be necessary in order to drive the vehicle. Furthermore, if the engine is kept too cold, incomplete or imperfect combustion takes place, resulting higher than necessary emissions from the vehicle. Thus, by overcooling the engine in some situations, the emissions of the vehicle can be higher than desired, in addition to whatever increase in emissions results from the increased amount of power the engine must develop in order to drive the water pump even when the water pump is not needed.

Electrically powered, variable speed water pumps have been used in some instances, however, such pumps are typically expensive and they impose an additional electrical load on the vehicle's battery, which is not always desirable.

A wrap spring clutch that is controlled by an actuator has been proposed, which engages and disengages the belt drive from the water pump as needed, so as to reduce the overall power consumption of the water pump. While this is successful, other ways of controlling the engagement of the water pump would be beneficial.

SUMMARY

In an aspect, a clutched device is provided, and includes an input member, an output member, a one-way clutch that can operatively connect the input member to the output member, and a motor including a stator and a rotor. The rotor is connected for rotation with a portion of the one-way clutch. The stator is operable to apply a first magnetic driving force to cause movement of the portion of the one-way clutch in a first rotational direction to increase a force of engagement between the input and output members. The stator is operable to apply a second magnetic driving force to cause movement of the portion of the one-way clutch to disengage the input and output members from each other.

In another aspect, a water pump is provided and includes an input member that is rotatable via an endless drive member, an output member, a water pump impeller connected to the output member, a one-way clutch that can operatively connect the input member to the output member; and a motor including a stator and a rotor. The rotor is connected for rotation with a portion of the one-way clutch. The stator is operable to apply a first magnetic driving force to cause movement of the portion of the one-way clutch in a first rotational direction to increase a force of engagement between the input and output members. The stator is operable to apply a second magnetic driving force to cause movement of the portion of the one-way clutch to disengage the input and output members from each other (e.g. by disengaging the one-way clutch from one of the input and output members). The water pump impeller is driven in the first rotational direction to drive fluid flow through a cooling system in a first fluid flow direction when the input member drives the output member via the one-way clutch. The stator is operable to apply a third magnetic driving force to drive movement of the rotor in a second rotational direction, which maintains disengagement of the input member from the output member. The rotor is operatively connectable to the output member so as to drive the water pump impeller in the second rotational direction to drive fluid flow through the cooling system in a second fluid flow direction when the stator is operated to apply the third magnetic driving force.

In yet another embodiment, a water pump is provided, and includes an input member that is rotatable via an endless drive member, a first output member having a first water pump impeller mounted thereon, a second output member having a second water pump impeller mounted thereon, a first clutch selectively operable to control torque transfer between the input member and the first output member, and a motor that is operatively engageable with the second output member and is controllable to drive the second water pump impeller when the first clutch prevents torque transfer from the input member to the first output member.

In yet another aspect, a water pump is provided, and includes an input member that is rotatable via an endless drive member, an output member, a first water pump impeller connected to the output member, a second water pump impeller connected to the output member via a second impeller one-way clutch, an input member one-way clutch that can operatively connect the input member to the output member, and a motor including a stator and a rotor. The rotor is connected for rotation with a portion of the input member one-way clutch. The stator is operable to apply a first magnetic driving force to cause movement of the portion of the one-way clutch in a first rotational direction to increase a force of engagement between the input and output members. The stator is operable to apply a second magnetic driving force to cause movement of the portion of the one-way clutch to disengage the input and output members from each other. When the input member drives the output member in the first rotational direction via the input member one-way clutch the first water pump impeller is driven by the output member to fluid flow through a cooling system in a first fluid flow direction and the second impeller one-way clutch is configured to disengage the output member from the second water pump impeller. When the stator is operated to apply a third magnetic driving force to drive movement of the rotor in a second rotational direction, the input member is disengaged from the output member, the rotor is operatively connected to the output member and drives the output member in the second rotational direction, the second impeller one-way clutch is configured to drive the second water pump impeller so as to drive fluid flow through the cooling system in a second fluid flow direction.

BRIEF DESCRIPTION OF THE DRAWINGS

The foregoing and other aspects of the disclosure will be more readily appreciated by reference to the accompanying drawings, wherein:

FIG. 12 is a table listing different operative modes that can be activated for the water pump shown in FIG. 11;

DETAILED DESCRIPTION OF EMBODIMENTS

Figure 1:
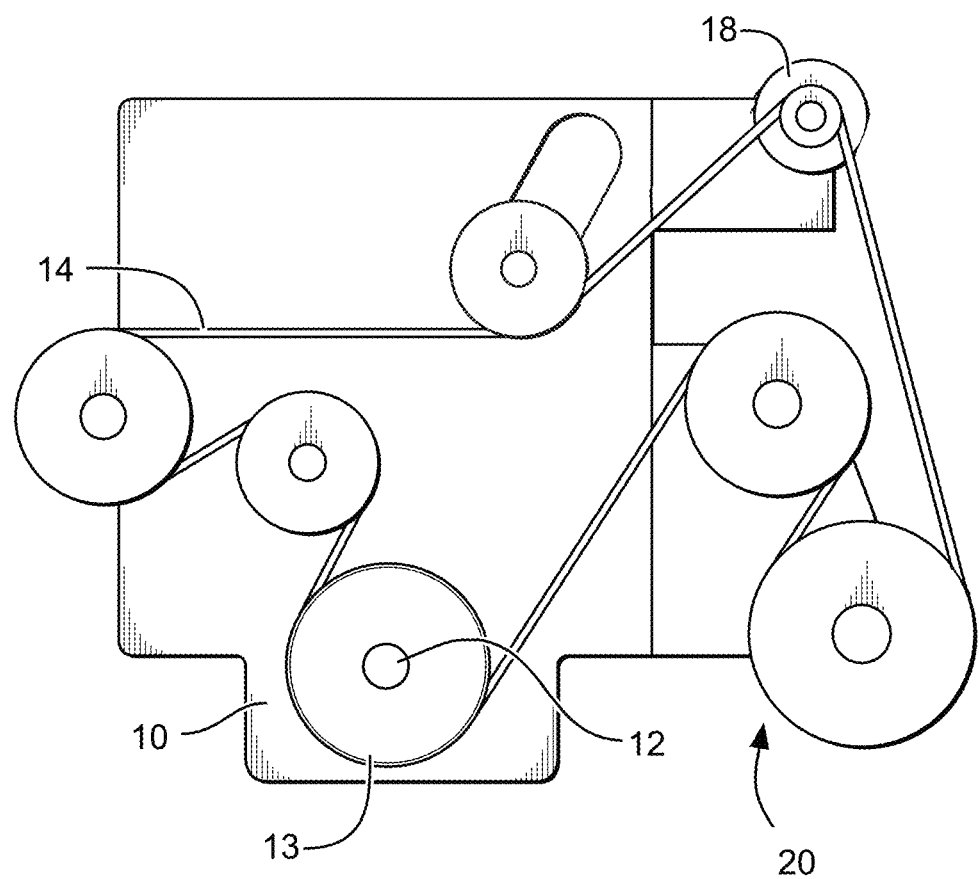
FIG. 1 is an elevation view of an engine with a belt drive with a water pump in accordance with an embodiment of the present invention.

Reference is made to FIG. 1, which shows an engine 10 for a vehicle. The engine 10 includes a crankshaft 12 which drives a crankshaft pulley 13, which in turn drives an endless drive member 14, which may be referred to as a belt 14 for convenience, with the understanding that any other suitable endless drive member could instead be used. Via the belt 14, the engine 10 drives a plurality of accessories. One such accessory is a battery-charging device 18, such as an alternator or an MGU (motor-generator unit). It will be noted that, in some embodiments, the endless drive member 14 could be one or more gear or any other suitable type of torque transfer element to transfer engine torque to the accessories.

Figure 10:
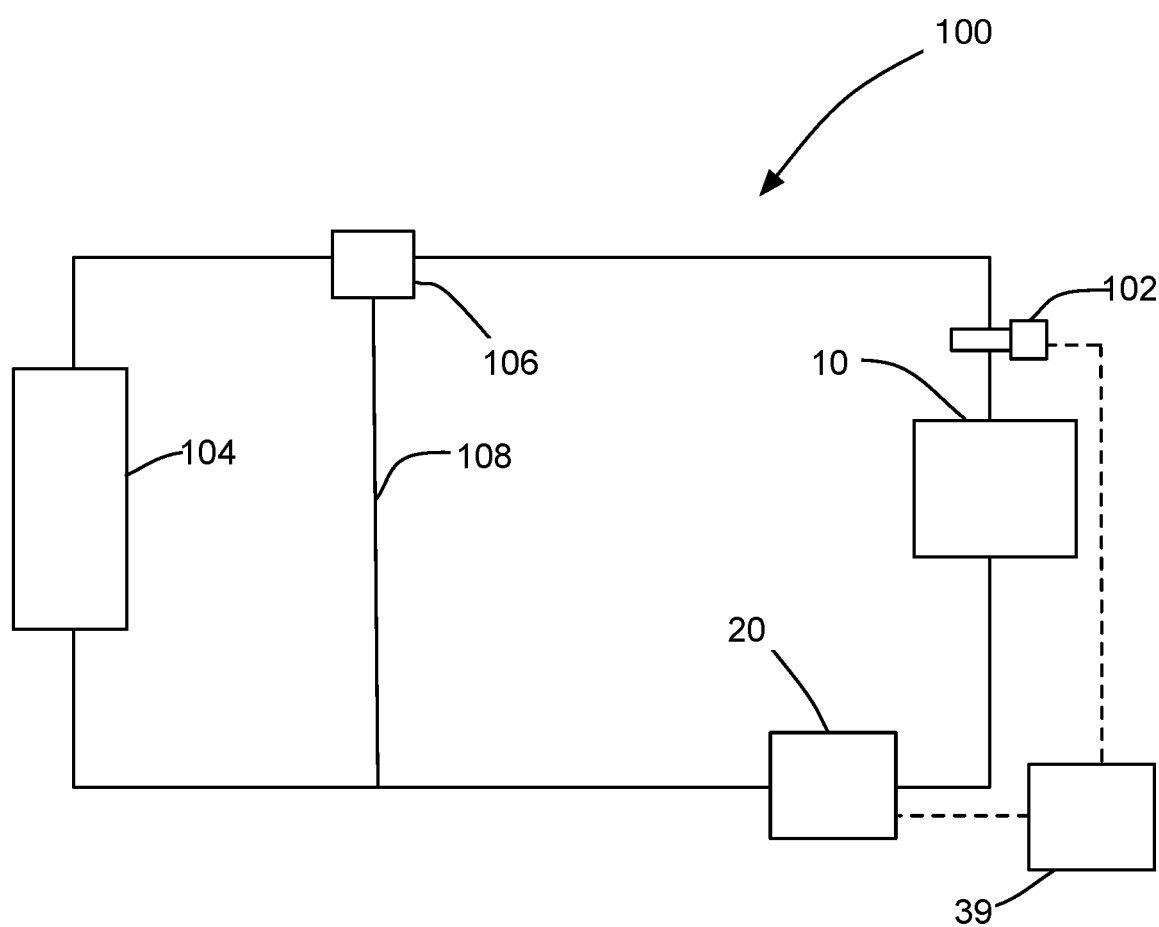
FIG. 10 is a schematic illustration of a cooling system for the engine shown in FIG. 1.

One of the accessories is a water pump 20. The water pump 20 is used to pump coolant through a cooling system shown at 100 in FIG. 10. The cooling system 100 serves several purposes. One purpose is prevent overheating of the engine 10. Another purpose is to draw heat from the engine 10 that will be used to heat the vehicle's cabin (not shown). The cooling system 100 may include a number of typically provided items such as a temperature sensor 102, a radiator 104, a valve 106 that sends coolant flow through the radiator 104 when needed or through a bypass line 108.

Figure 2:
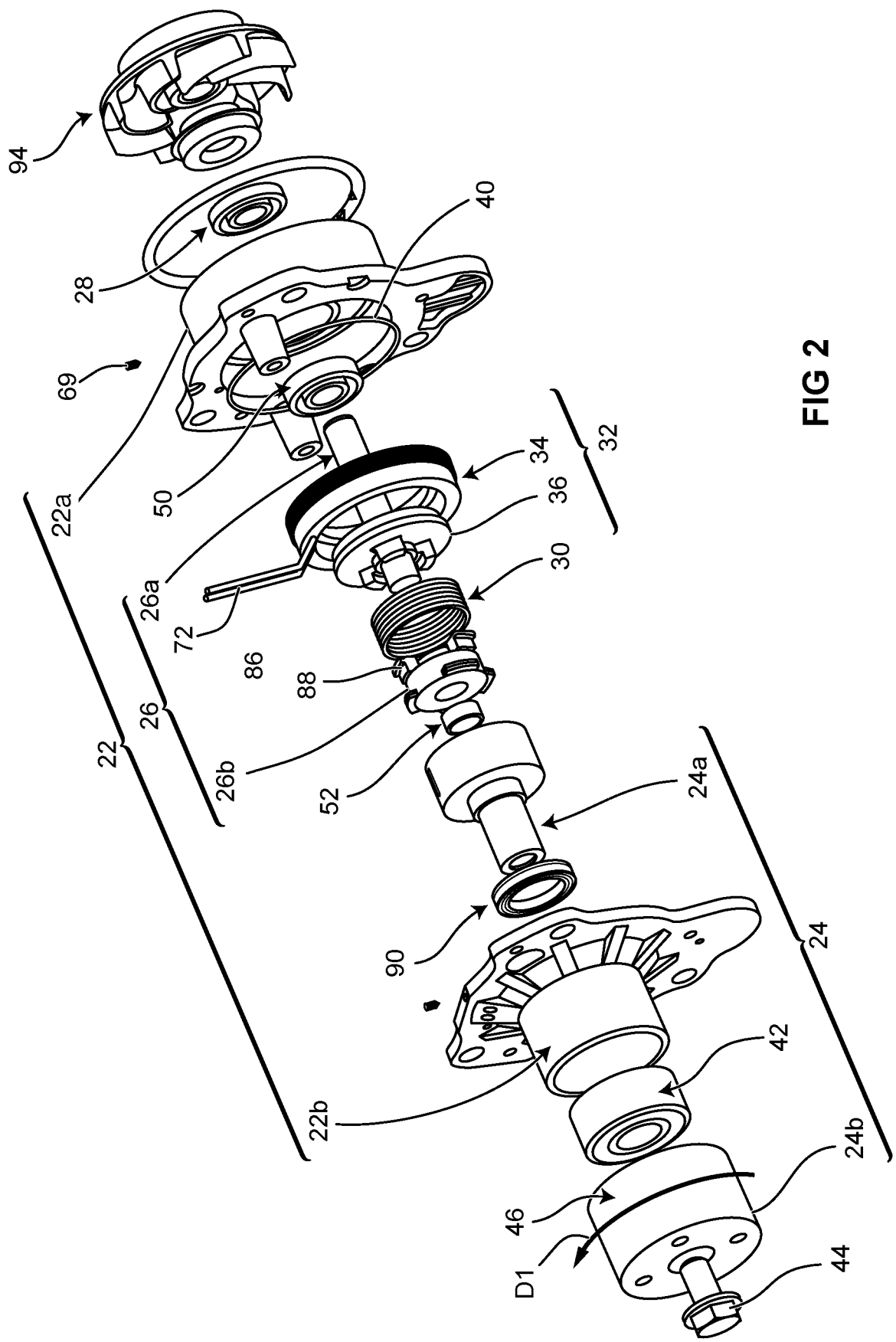
FIG. 2 is an exploded perspective view of the water pump shown in FIG. 1.
Figure 3:
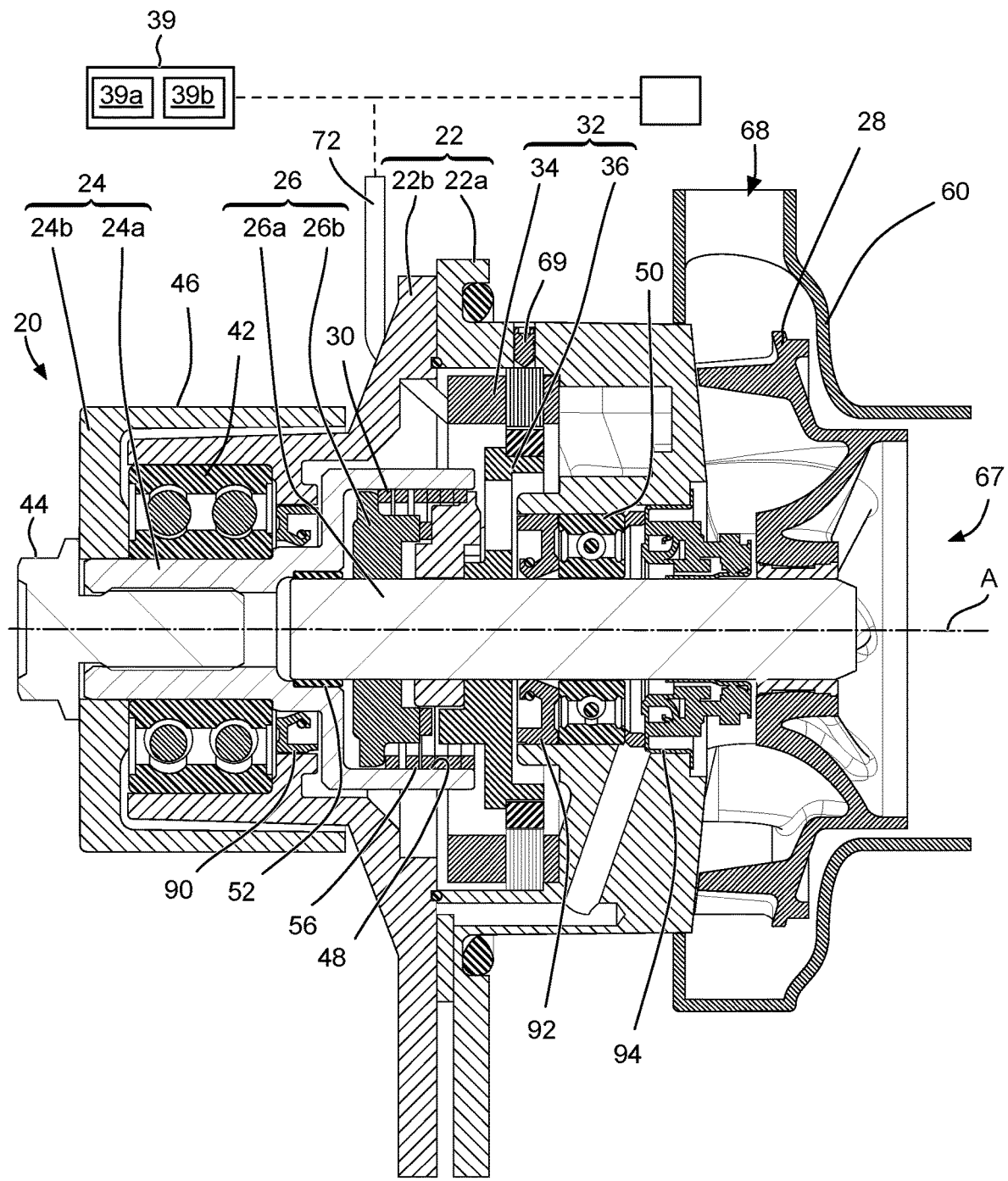
FIG. 3 is a sectional elevation view of the water pump shown in FIG. 1.

Referring to FIGS. 2 and 3, the water pump 20 is a clutched device that includes a housing 22, an input member 24, an output member 26, a water pump impeller 28 on the output member 26, a one-way clutch 30, a motor 32 that includes a stator 34 and a rotor 36 that includes an actuator 38 (FIG. 4) for the one-way clutch 30, and a control system 39 for controlling the current to the motor 32.

The housing 22 may be made from a first housing portion 22a and a second housing portion 22b that are joined together by any suitable means such as by mechanical fasteners (not shown). Because the example clutched device contains lubricant, a seal member 40 such as an o-ring may be provided between the housing portions 22a and 22b in order to prevent leakage of lubricant from the housing 22.

The input member 24 includes an input shaft 24a that is rotatably mounted to a bore of the housing portion 22b via an input shaft support bearing 42, for rotation about a device axis A (FIG. 3). The input member 24 further includes a pulley 24b that is connected to the input shaft 24a, e.g. via a mechanical fastener 44. The pulley 24a has a belt engagement surface 46 that is engageable with the belt 14 (FIG. 1) so as to drive rotation of the pulley 24a (and therefore the input member 24) in a first rotational direction D1 shown in FIGS. 2 and 4.

The input member 24 (the input shaft 24a specifically) has a radially inner surface 48 that may also be referred to as an input member clutch engagement surface 48 because it engages the one-way clutch 30.

The output member 26 includes an output shaft 26a and a driver 26b fixedly connected to the output shaft 26a e.g. by press-fit, or by any other suitable method. The output shaft 26a is rotatably supported on an inner surface of the housing portion 22b via an output shaft support bearing 50. The output shaft 26a is also rotatably support one another through a bushing 52 that engages a radially outer surface of the output shaft 26a and a radially inner surface of the input shaft 24a.

The output member 26 (the driver 26b specifically) has an output member clutch engagement surface 54 (FIG. 4) that is described in further detail further below. The one-way clutch 30 can transfer torque from the input member 24 to the output member 26 during rotation of the input member 24 relative to the output member 26 in the first rotational direction D1. More specifically, in the embodiment shown the one-way clutch 30 is a wrap spring clutch, although it could alternatively be any other suitable type of one-way clutch such as a sprag clutch, a roller clutch, a cam clutch, a pawl/ratchet clutch, for example. The one-way clutch 30 may be referred to as the input member one-way clutch 30.

In the example shown, the input member 24 transfers torque to the radially outer surface (shown at 56 in FIGS. 3 and 4) of the coils of the wrap spring clutch 30 via the input member clutch engagement surface 48. The torque is transferred from the wrap spring clutch 30 into the driver 26b via the engagement surface 54 (FIG. 4) that is engaged with a first helical end 58 of the wrap spring clutch 30. The driver 26b transfers the torque into the output shaft 26a. The output shaft 26a and driver 26b thus rotate in the first rotational direction D1.

The water pump impeller 28 is fixedly mounted to the output member 26 (e.g. by way of a keyed connection or a press-fit mounting to the output shaft 26a). Thus, rotation of the output shaft 26a drives rotation of the water pump impeller 28.

Figure 7:
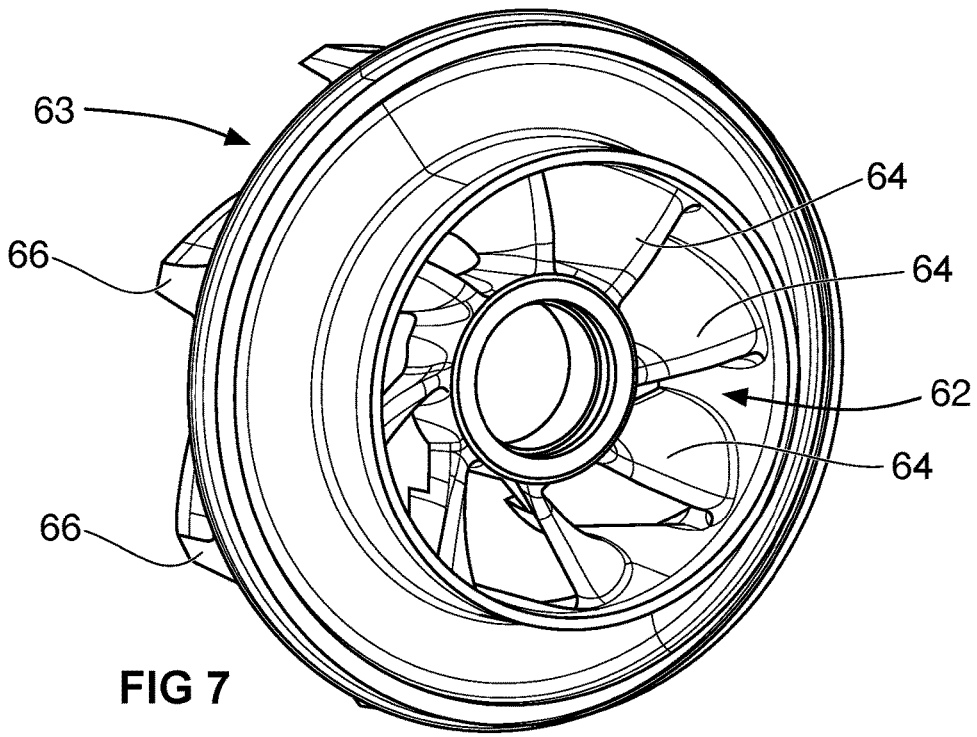
FIG. 7 is a perspective view of an impeller from the water pump shown in FIG. 1.
Figure 8:
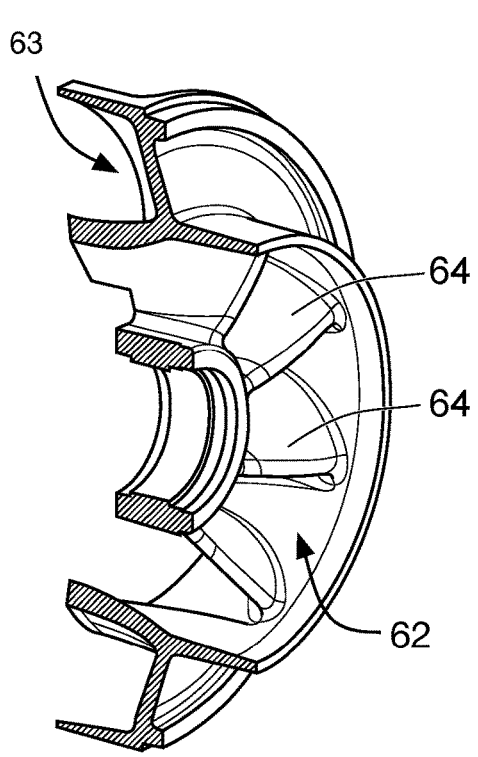
FIG. 8 is a sectional perspective view of the impeller shown in FIG. 7.
Figure 9:
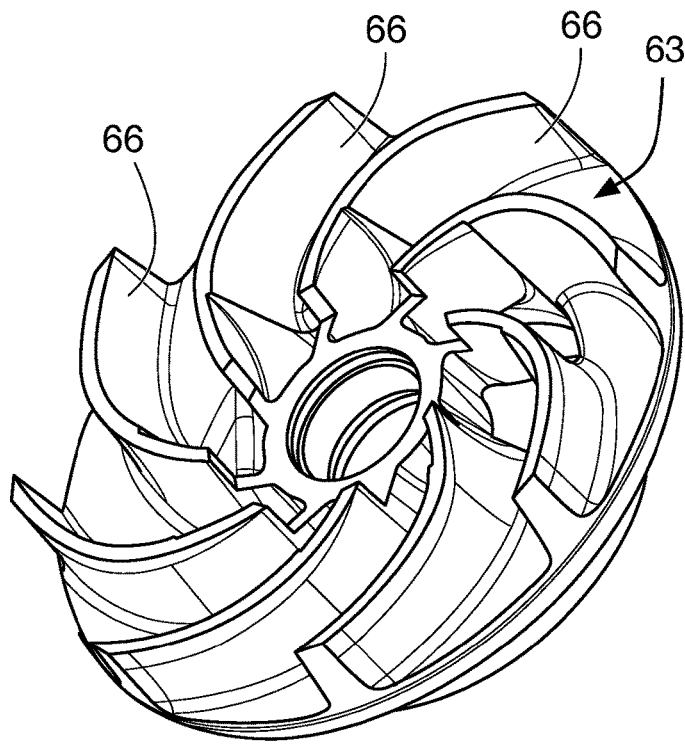
FIG. 9 is another perspective view of the impeller from the water pump shown in FIG. 1.

The water pump impeller 28 is shown in more detail in FIGS. 7-9. The water pump impeller 28 may have an axial flow portion shown at 62, which is configured to generate a flow of water in an axial direction, and a radial flow portion flow portion 63, which is configured to generate a flow of water in a radial direction. As can be seen the axial flow portion is made up of axial flow vanes 64, which transfer water into radial flow vanes 66. In some embodiments the impeller 28 may be a typical impeller 28 that is commonly used in vehicle cooling system water pumps today.

A water pump housing is schematically shown at 60 in FIG. 3. Under normal operating conditions water is drawn through a first housing port 67 (which may be referred to as a housing inlet 67) and is discharged through a second housing port 68 (which may be referred to as a housing discharge 68).

Figure 4:
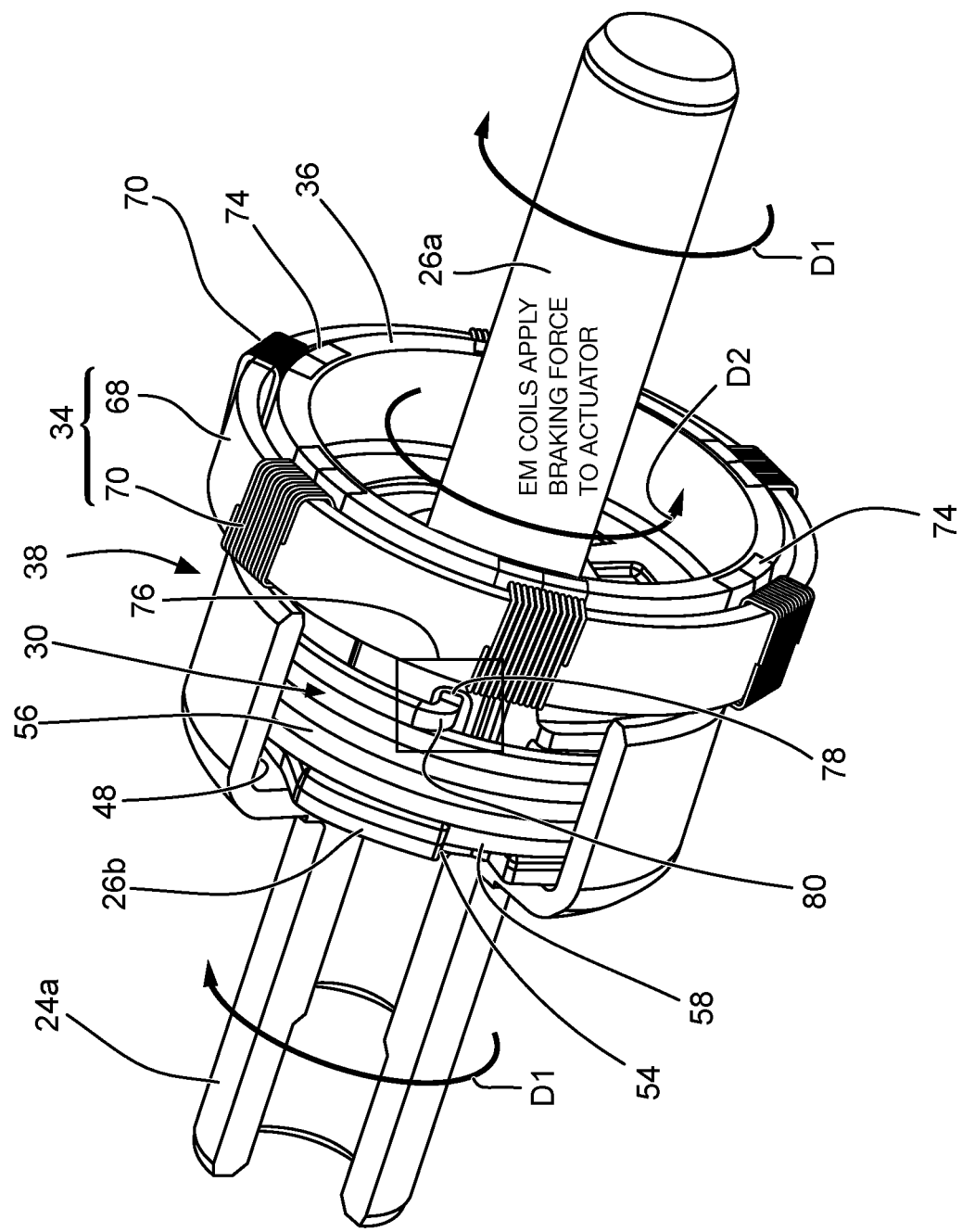
FIG. 4 is a partial cutaway perspective view of a portion of the water pump shown in FIG. 1.

The motor 32 (FIG. 2) is a brushless DC motor. Referring to FIG. 3, the stator 34 for the motor 32 is mounted to the housing 22 and may be captured at least in part by a set screw 69. Referring to FIG. 4, the stator 34 contains a ferrite core 68 with any suitable number of copper windings (electromagnetic coils) 70 thereon. Power is sent to the stator 34 from any suitable source such as the vehicle's battery via an electrical conduit 72 (FIG. 3). The rotor 36 is rotatably supported on the output shaft 26b, and may have a plurality of permanent magnets 74 (e.g. rare earth magnets, such as Neodymium, or Samarium Copper) thereon so that it can be driven the stator 34 in the first rotational direction D1 or the second rotational direction shown in FIG. 4 at D2. The current to the stator 34 can be controlled by the control system 39 so as to control the magnetic force applied to the rotor 36.

The actuator 38 is integrally connected to, and thus driven by, the rotor 36. The actuator 38 has a clutch control member 76 that may be a fork that engages an inwardly bent tang 78 at the second helical end 80 of the wrap spring clutch 30 as shown in FIG. 4. Any other suitable structure for the clutch control member 76 may be provided. The combined body of the rotor 36 and actuator 38 may be formed from any suitable material such as from a steel or aluminum, or a suitable polymeric material or any suitable combination thereof.

Figure 5:
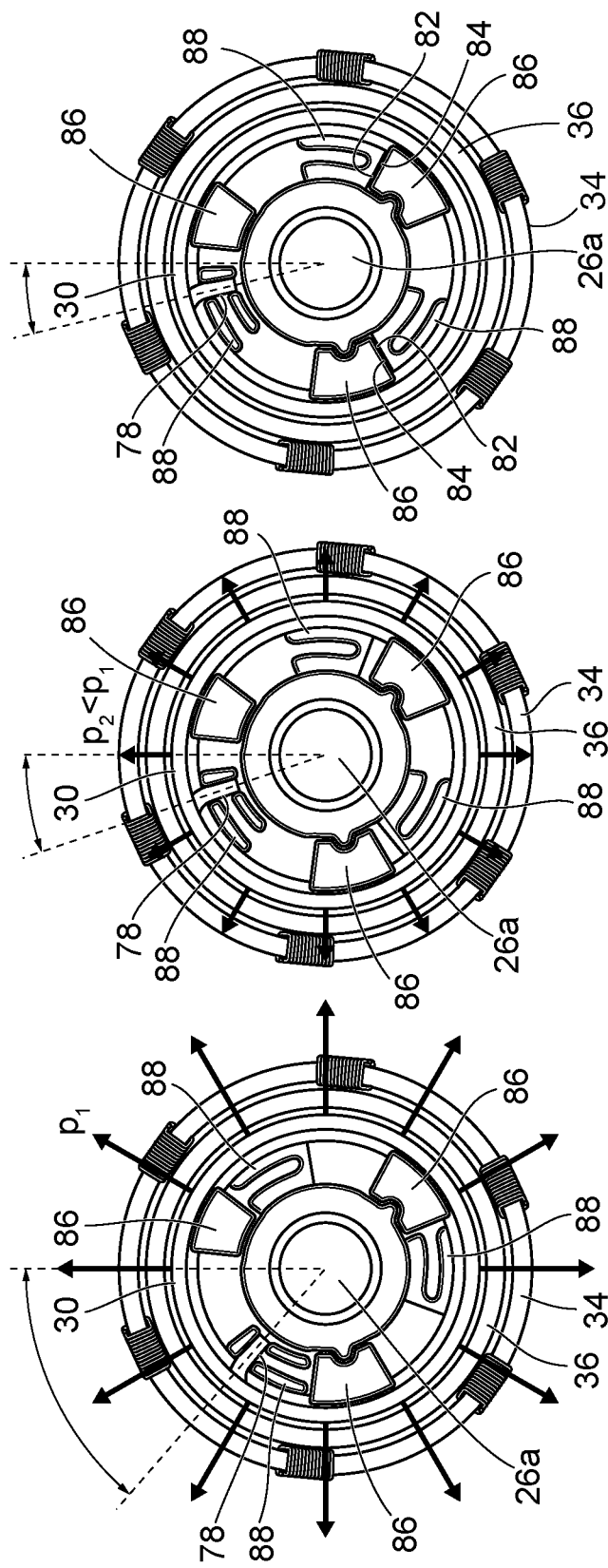
FIGS. 5A-5C are elevation views of a portion of the water pump in a range of positions according to an embodiment.
Figure 6:
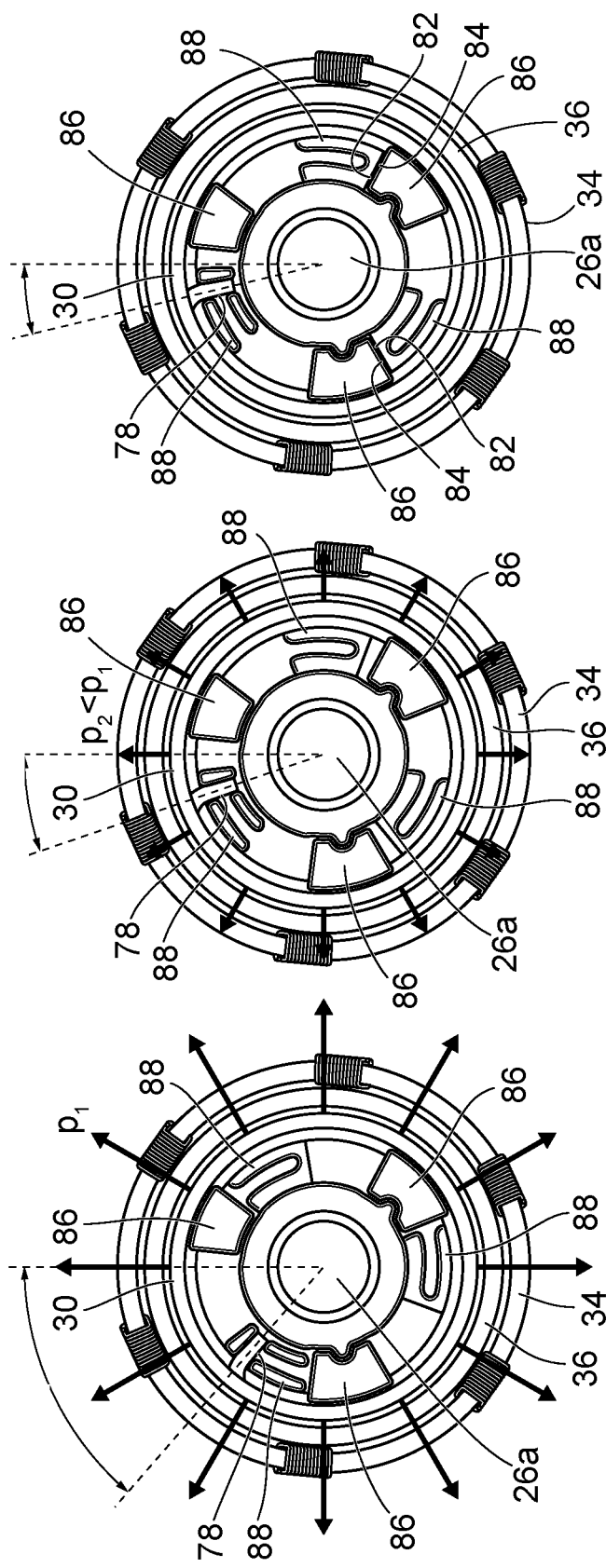
FIGS. 6A-6C are elevation views of a portion of the water pump in a range of positions according to another embodiment.

The actuator 38 will have a rest position based on the rest position of the tang 78 of the clutch 30. By selecting and applying a selected current to the motor 32 (to the stator 34 specifically), the actuator 38 can be urged in either the first or second rotational directions, thereby bringing the tang 78 of the wrap spring clutch in the first or second rotational directions relative to the first end 58 of the wrap spring clutch 30. This movement of the tang 78 changes the effective diameter of the wrap spring clutch 30, which in turn changes the force with which the wrap spring clutch engages the inner surface 48 of the input shaft 24a, thereby changing the amount of torque that can be transferred from the input member to the output member 26. This in turn controls the speed of the output member 26 relative to the input member 24. The range of movement of the tang 78 includes a first position, shown in FIGS. 5A and 6A, in which the wrap spring clutch 30 has a first amount of engagement force (represented by arrows p1) with input member 24 so as to permit a first amount of torque transfer therebetween, and a second position, shown in FIGS. 5C and 6C in which the wrap spring clutch 30 has reduced in diameter sufficiently that it is completely disengaged from the input member 24 (so that no torque transfer is permitted). In the intermediate positions shown in FIGS. 5B and 6B, the wrap spring clutch 30 has a second amount of engagement force (represented by arrows p2) with the input member 24 so as to permit some torque transfer that is less than the torque transfer permitted in the position shown in FIGS. 5A and 6A. It can be seen visually that the arrow making up p2 are smaller than the arrows making up p1. In general, once the engagement force is reduced sufficiently, as the tang 78 continues to be moved to further reduce the engagement force between the wrap spring clutch 30 and the input member 24, there is progressively increased slippage between the wrap spring clutch 30 and the input member 24.

In the embodiment shown in FIGS. 5A-5C, the position shown in FIG. 5B is the position of the tang 78 when no current is supplied to the motor 32. Thus, in that embodiment, the wrap spring clutch 30 has some engagement with the input member 24 and is capable of transferring some amount of torque to the output member 26 when no current is sent to the motor 32. When current is applied in a first current direction to the motor 32, a first magnetic driving force is applied by the stator 34 to the rotor 36, which drives the tang 78 in the first rotational direction D1 towards the first position (FIG. 5A) in order to increase the amount of torque that is transferred to the output member 26, thereby increasing the speed of the impeller 28 towards the speed of the input member 24. When current is applied in a second current direction to the motor 32, the tang 78 is driven in the second rotational direction D2 towards the second position (FIG. 5C) in order to decrease the amount of torque that is transferred to the output member 26, thereby decreasing the speed of the impeller 28 towards zero.

In the embodiment shown in FIGS. 6A-6C, the position shown in FIG. 6A is the position of the tang 78 when no current is supplied to the motor 32. Thus, in that embodiment, the wrap spring clutch 30 has no engagement with the input member 24 and is not capable of transferring torque to the output member 26 when no current is sent to the motor 32. When current is applied in the first current direction to the motor 32 the tang 78 is driven in the first rotational direction D1 towards the first position (FIG. 6A) in order to increase the amount of torque that is transferred to the output member 26, thereby increasing the speed of the impeller 28 towards the speed of the input member 24. If the applied current is at a certain level, then a first magnetic driving force is applied by the stator 34 to the rotor 36 and the tang 78 reaches the position shown in FIG. 6B. If the applied current is at a different, higher, level, then a second magnetic driving force is applied by the stator 34 to the rotor 36 and the tang 78 reaches the position shown in FIG. 6A.

The total range of movement of the tang 78 relative to the first end 58 of the wrap spring clutch 30 may be about 20 degrees or any other suitable angle.

The amount of current supplied to the motor 32 may be determined based on the desired amount of torque to transfer to the impeller 28. More specifically, control of slippage of the clutch 30 (and therefore the output member 26) relative to the input member 24 is achieved by varying the energizing torque of the clutch 30 according to the following equation: $M_t=(k-1)*M_{net}$, where:

$M_t$ is the torque transmitted to the impeller;

$M_e$ is the net energizing torque. It is calculated by subtracting the braking torque of the stator 34 from the energizing torque generated by the frictional force of the wrap spring clutch 30 on the input shaft bore 48. $M_{net}=(M_e-M_b)$; and k is a coefficient based on the number of clutch turns (N) & coefficient of friction ($c_f$). $k=e^{\wedge}(2*pi*N*c_f)$. For N=6 and $c_f$=0.1, k=43 and $M_t$=42*$M_{net}$.

By reducing the net energizing torque, a lower transmitted torque will be produced. If the transmitted torque is reduced below the requirement of the impeller, slip will result until the impeller slows to down to match carrying torque of the clutch.

In some embodiments, once the wrap spring clutch 30 is disengaged from the input member 24, current can be applied to the motor 32 in the second current direction that rotates the rotor 36 sufficiently to generate a third magnetic driving force applied by the stator 34 on the rotor 36, which turns the rotor 36 sufficiently to cause engagement of output member drive surfaces 82 on the rotor 36 with rotor engagement surfaces 84 on the output member 26. The output member drive surfaces 82 may be on rotor lugs 86 on the rotor 36. The rotor engagement surfaces 84 may be on output member lugs 88 that are on the driver 26*b*. Once engagement occurs between the surfaces 82 and 84, continued application of a sufficient current in the second current direction to the motor 32 so as to generate the third magnetic driving force by the stator 34 on the rotor 36 will drive the driver 26*b* and therefore the entire output member 26 in the second rotational direction. In embodiments where the impeller 28 is suitably configured (as is the case in the example impeller shown in FIGS. 7-9), this rotation of the output member 26 (and therefore the impeller 28) in the second rotational direction will cause some amount of water flow through the vehicle's cooling system 100 (FIG. 10) in the opposite direction to the direction of flow that normally occurs when the water pump 20 is being driven by the belt 14 (FIG. 1). This coolant flow when the motor 32 drives the output shaft 26*a* through the vehicle's cooling system 100 (and therefore through the engine 10) will remove some heat from the engine 10. The direction of flow of the coolant normally when the pump 20 is driven by the belt 14 may be referred to as a first fluid flow direction. The direction of flow of the coolant when the output shaft 26*a* is driven in the second rotational direction by the motor 32, may be referred to as a second fluid flow direction.

There are several advantages to providing the capability to drive some flow of coolant through the engine 10 using the arrangement shown herein. In an effort to decrease fuel consumption, some vehicles automatically shut down their engines whenever the vehicle is stopped for a short period of time, such as when the vehicle is at a stoplight. However, when the engine stops running, the crankshaft no longer drives the belt and therefore no longer drives the accessories including the water pump. However, the coolant from the cooling system is what is used to provide heat to an airflow leading to the vehicle's cabin when the vehicle occupants request heat to the cabin. Thus, if the coolant flow in the cooling system stops, as occurs in some prior art vehicles, the airflow leading to the cabin will quickly cool, which can lead to passenger discomfort. By contrast, by using the motor 32 to drive the impeller 28 backwards, some coolant flow is achieved through the cooling system 100, which can be sufficient to heat the airflow to the cabin and therefore keep the vehicle occupants comfortable. This can preclude the need to use an MGU as the battery charging unit 18, which is done in some prior art vehicles so as to permit driving of the belt 14 (using the MGU 18) so as to permit operation of all the belt-driven accessories even when the engine 10 is off.

The flow of coolant is also helpful to prevent the development of hot spots in the engine, which can arise due to localized regions that receive more heat than other regions. These hot spots, which can be detrimental to the engine in and of themselves, can result in cold spots in other parts of the engine such as inside one or more of combustion chambers of the engine, which can have a negative impact on the combustion efficiency in those combustions chambers and therefore on the fuel economy and emissions of the vehicle. By reducing or eliminating these hot spots and maintaining a more uniform engine temperature, the engine 10 is more easily operated to control emissions and provide good fuel economy.

Tests were carried out to determine the amount of coolant flow that was achieved on a test coolant loop when turning a typical water pump impeller that is similar to impeller 28 forwards and backwards. It was found that the flow rate achieved when running the impeller 28 backwards was about 30-35% of the flow rate when running the impeller 28 forwards, over a wide range of RPMs. In general, flow rates of between 20% and 40% of the flow rate in the first direction can be expected, using some standard impellers. This level of backwards flow when running the impeller 28 is sufficient to inhibit hot spots and cold spots in the engine 10 when the engine 10 is off. Additionally, it will be understood that the water pump impeller 28 could be operated at a relatively higher RPM than the engine 10 was at before being temporarily shut down. For example if the engine was operating at a speed to drive the water pump at 1000 RPM and was then shut down upon the vehicle reaching a stoplight, then, while at the stoplight the water pump impeller may be run backwards at about 2500 RPM so as to achieve a similar flow rate as when the engine 10 was on.

Optionally, one or more features may be provided on the impeller 28 to improve its flow rate when run backwards. A first option would be to mold soft flexible tips to the ends of the impeller vanes, which would straighten when spun in the first rotational direction, to facilitate and optimize the pumping action, but which would rotate or otherwise alter their curvature when spun in the second rotational direction D2, in order to increase the pumping efficiency of the impeller 28 when the impeller 29 is spun in the second direction.

A second option would be to mold fine striations into the side of the impeller 28, which would not diminish the pumping efficiency of the impeller 28 when spun in the first direction, but which would sufficiently engage the liquid coolant when the impeller is spun in the second direction, in order to "pull" and circulate the coolant via surface tension, when the impeller 28 is spun in the second direction.

A third option would be to apply a hydrophobic coating to reject adhesion of coolant to a surface and/or hydrophilic coating to induce adhesion of coolant to a surface to one or more surfaces of the water pump impeller, in order to increase or decrease the surface adhesion of the coolant to the various surfaces of the water pump impeller, in order to improve the pumping efficiency of the impeller when rotated in the second direction, without significantly de-rating the efficiency of the water pump impeller 28 when spun in the first direction.

In the embodiment shown in FIGS. 5A-5C, where the wrap spring clutch 30 is engaged with the input member 24 even when no power is applied to the motor 32, it will be understood that, to drive the tang 78 towards the position shown in FIG. 5C, the current to the motor 32 is in the second direction so as to drive the tang 78 in the second rotational direction. During these events, the magnetic braking force supplied by the motor 32 can be used to charge a battery (such as the vehicle's battery, shown at 79 in FIG. 3) thereby acting as a regenerative braking system. In other words, the control system 39 (FIG. 3) may apply current to the motor 32 in the second direction to generate a second magnetic driving force that is a braking force on the rotor 36 thereby operating the motor 32 as a generator that is configured to charge a battery (shown at 90 in FIG. 3) with induced current from the motor 32 when operating the motor 32 as a generator.

The motor 32 shown in FIGS. 2-6c herein is a radial flux motor. It will be understood, however, that any suitable type of motor could be used, such as, for example, an axial flux motor, a brushless, frameless torque ring motor, a switched reluctance motor, a hub motor, a direct drive frameless torque/ring/hub motor, a printed circuit motor, or any other suitable motor such as, for example, a hydraulic motor, a pneumatic motor, a vacuum motor. In some embodiments a single motor may be used to drive the movement of the clutch tang 78. In other embodiments, a plurality of motors could be used.

The control system 39 may be any suitable type of control system and may be made up of a plurality of individual controllers or may be a single controller. In general, the control system 39 includes a processor 39a and a memory 39b (FIG. 3). The processor 39a carries out instructions that are stored in the memory 39b. It will be noted that the control system 39 is shown as a unitary structure in FIG. 3 for convenience only, but that it can be distributed over one or more individual controllers.

As shown in FIGS. 2 and 3 oil seals shown at 90 and 92 may be provided in embodiments wherein the wrap spring clutch 30 is lubricated with oil.

A water seal member 94 is provided to prevent leakage of water into the housing 22.

While the clutched device 20 is a water pump, it will be understood that some other belt-driven accessory could additionally or alternatively be a clutched device as described herein.

While the impeller 28 shown is a combination of an axial flow and a radial flow configuration, it will be understood that the impeller 28 may be an axial flow configuration, a radial flow configuration or any other suitable configuration.

Figure 11:
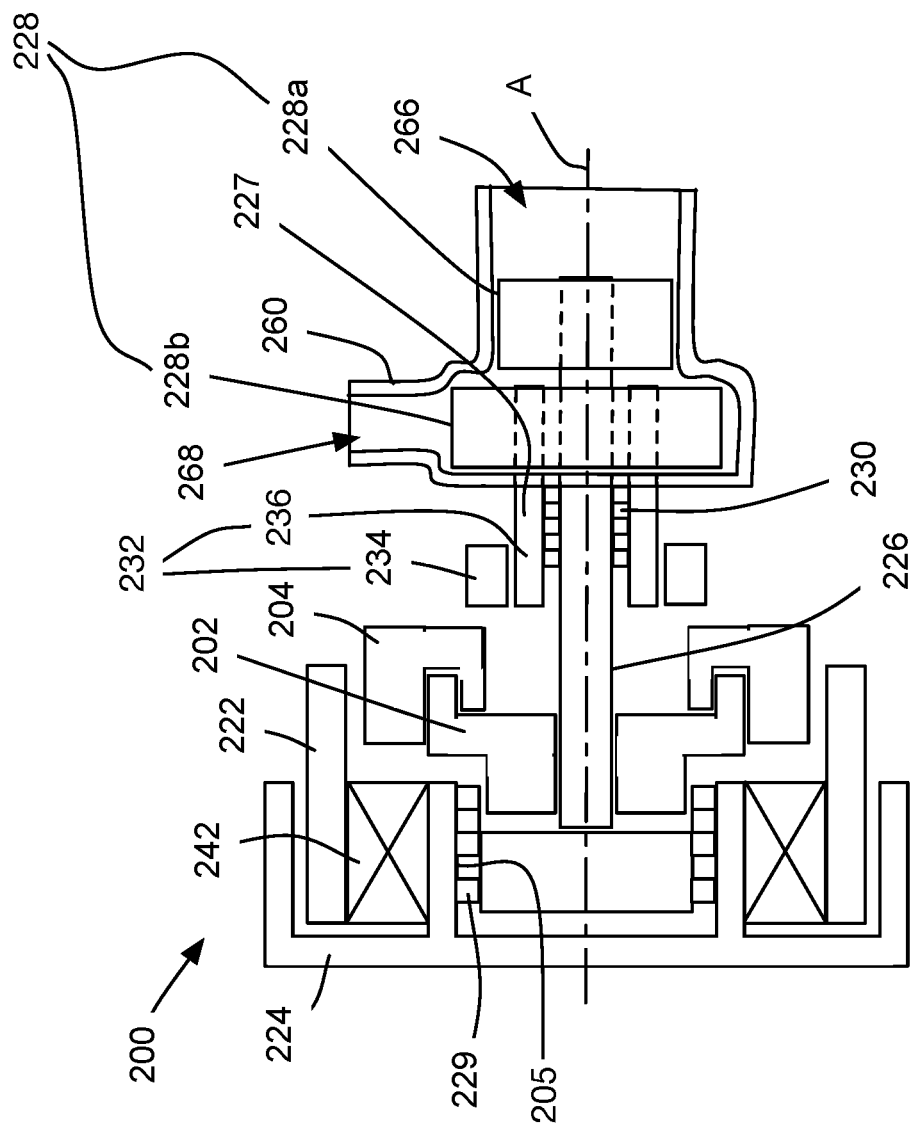
FIG. 11 is a sectional side view of a water pump in accordance with another embodiment.

Reference is made to FIG. 11, which shows a clutched device 200 (which may, as above, be a water pump) in accordance with another embodiment, in which a compound impeller (shown at 228) comprises two individual impellers, namely an axial flow (low pressure, high flow rate) impeller 228a and a radial flow (high pressure, low flow rate) impeller 228b. The clutched device 200 includes an input member 224, which may be a pulley that is driven by a belt similar to belt 14 in FIG. 1. The pulley 224 is rotatably supported on a clutched device housing 222 (a portion of which is shown in FIG. 11), by a bearing 242. The pulley 224 is operatively engageable with a first output member 226 via a first one-way clutch 229, which may be a wrap spring clutch or any other suitable type of clutch. The first output member 226 has a first impeller (impeller 228a) fixedly mounted thereon. The first output member 226 is itself operatively engageable with a second output member 227, via a second one-way clutch 230, which may also be a wrap spring clutch or any other suitable type of clutch. Thus, the first output member 226 may be considered to be an input member to the second wrap spring clutch 230.

In the example shown in FIG. 11, one end of the wrap spring clutch 229 is connected to an armature 202, which is movable axially by an electromagnetic coil 204. When the coil 204 is not powered, the clutch 229 transfers torque from the pulley 224 to the first output member 226. To disengage the clutch 229, movement of the armature 202 towards the right in FIG. 11 causes the armature 202 to frictionally engage a friction surface at which point the end of the wrap spring clutch 229 that is connected to the armature 202 moves angularly relative to the other end of the wrap spring clutch 229, which causes radial contraction of the wrap spring clutch 229 until there is no longer engagement between the clutch 229 and the clutch engagement surface shown at 205 of the pulley 224. This radial contraction of the clutch 229 disconnects the pulley 224 from the output member 226. An example of this arrangement is shown in U.S. Pat. No. 8,387,767, the contents of which are incorporated fully herein by reference. The coil 204 and armature 202 are just an example of a suitable clutch engagement control device. It will be understood however that any other suitable clutch engagement control device could be used.

The clutch 230 controls the operative connection between the first output member 226 and the second output member 227. A motor 232 may be provided, which includes a stator 234 which may be similar to stator 34 (FIG. 3), and a rotor 236 that is integral with the second output member 227.

A water pump housing 260 is provided, and has a first, suction port 266, and a second, discharge port, 268.

Using the motor 232 and the clutches 229 and 230, a variety of operative states or modes can be provided for the water pump 200. For example, in an 'idle-stop' mode, the clutch 229 may be disengaged so as to disconnect the pulley 224 from the first output member 226, and the motor 232 may be powered so as to drive the rotation of the second output member 227 in a first rotational direction that is the same rotational direction that the first output member 226 would be driven in by the pulley 224. The second wrap spring clutch 230 is in an overrun state, thereby permitting the rotation of the second output member 227. In this mode, the first impeller 228a is stationary, but the second, radial impeller 228b is driven to rotate, thereby driving some coolant through the vehicle's cooling system. This mode can be activated when the vehicle is stopped temporarily at a stoplight and the engine 10 shuts down for a short period of time.

With reference to FIG. 12, in a 'conventional' mode, the engine 10 is on, and drives the pulley 224. The first clutch 229 is engaged and transmits torque to the first output member 226, which, in turn, transmits torque to the second output member 227 via the second clutch 230. Accordingly, the speed of the output members 226 and 227 may be the same as that of the pulley 224. This mode may be used during normal operation of the vehicle while the vehicle is being driven.

In a 'warm up' mode, in an effort to permit the engine to warm up quickly, the first clutch 229 would be disengaged, thereby preventing torque transfer from the pulley 224 to the first output member, and the motor 232 may be unpowered. Accordingly, the speeds of the two output members 226 and 227 would be zero.

In a variable speed mode, the first clutch 229 may be disengaged so as not to transmit power from the pulley 224 to the first output member 226, and the motor 232 may be powered so as to cause the second output member 227 to be driven, so that the second clutch 230 is in an overrun state.

Because the speed of the motor 232 may be controlled (based on the amount of current that is sent to the motor 232), the speed of the second output member 227 may be varied as desired.

In an 'idle stop' mode, the engine 10 may be off and so the speed of the pulley 224 may be zero. The motor 232 may operate at a suitable speed (e.g. 1000 RPM) to maintain a selected amount of flow through the cooling system. In this mode, the first clutch 229 may be disengaged, disconnecting the pulley 224 from the first output member 226. As in the 'variable speed' mode, the second clutch 230 is in an overrun state.

Figure 13:
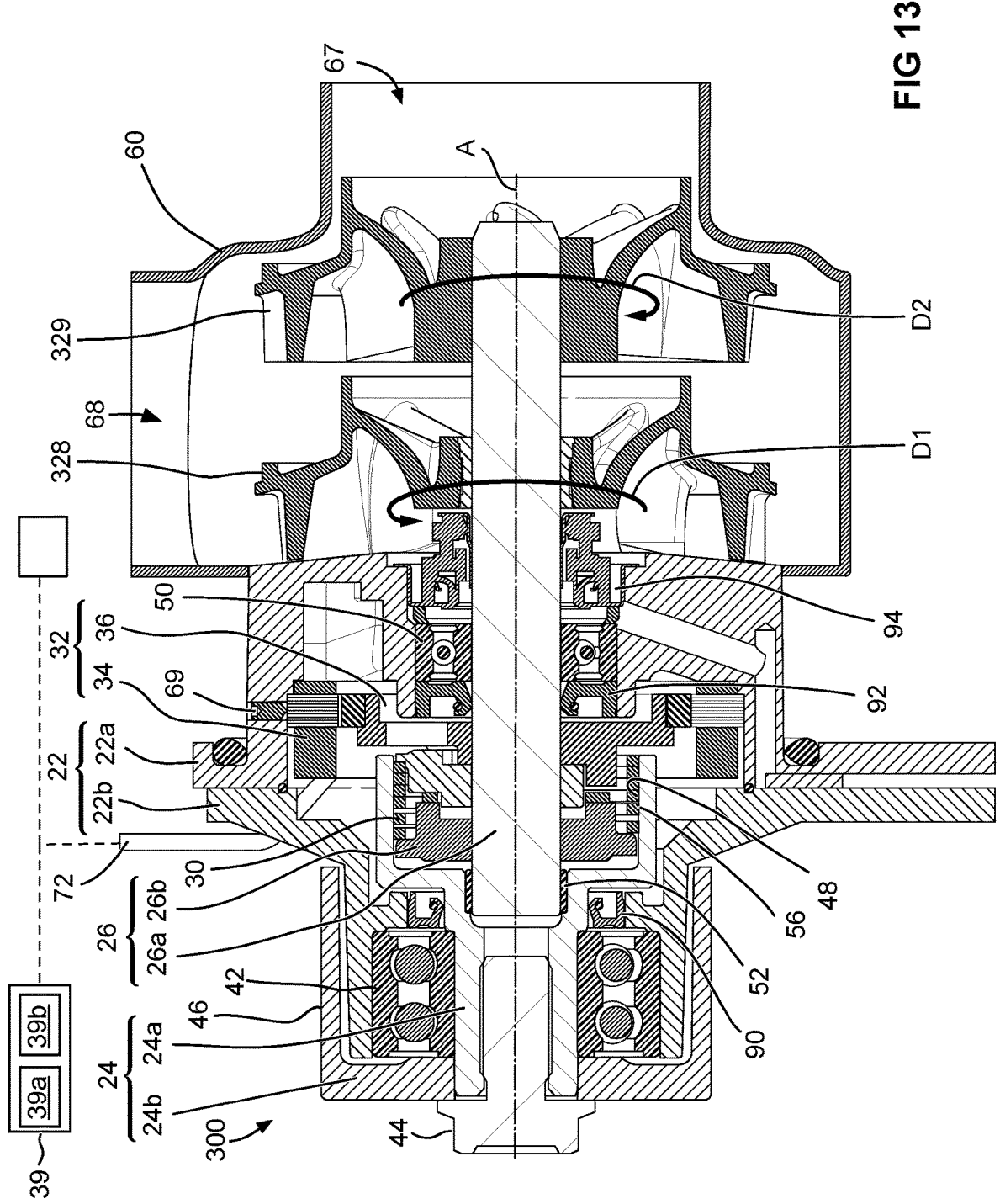
FIG. 13 is a sectional elevation view of the water pump shown in FIG. 1 with two impellers.

Reference is made to FIG. 13, which shows a water pump 300 in accordance with another embodiment. The water pump 300 is similar to the water pump 20 (FIG. 3) but includes two impellers 328 and 329 that are both mounted to the output shaft 26a. The impeller 328 is configured to drive coolant flow in the first fluid flow direction (i.e. from port 67 towards port 68), while the impeller 329 is configured to drive coolant flow in the second fluid flow direction (i.e. from port 68 towards port 67). Thus the impeller 328 is the primary means for causing coolant flow in the direction of coolant flow when the engine 10 is driving the water pump 300 via the belt 14 (i.e. from the first port 67 to the second port 68). The impeller 329 is the primary means for causing coolant flow when the motor 32 is driving the output member 26. The impeller 329 may be configured to avoid inhibiting fluid flow towards the axial flow portion of the impeller 328.

In terms of specific configurations, the impeller 328 may be similar to the impeller 28, and the impeller 329 may be similar to the impeller 328 but may have its vanes curved in the opposite direction to those of the impeller 328.

By providing the two impellers 328 and 329, the fluid flow through the coolant system may be similar both when the output member 26 is driven by the belt 14 (FIG. 1) and when the output member is driven by the motor 32.

Figure 14:
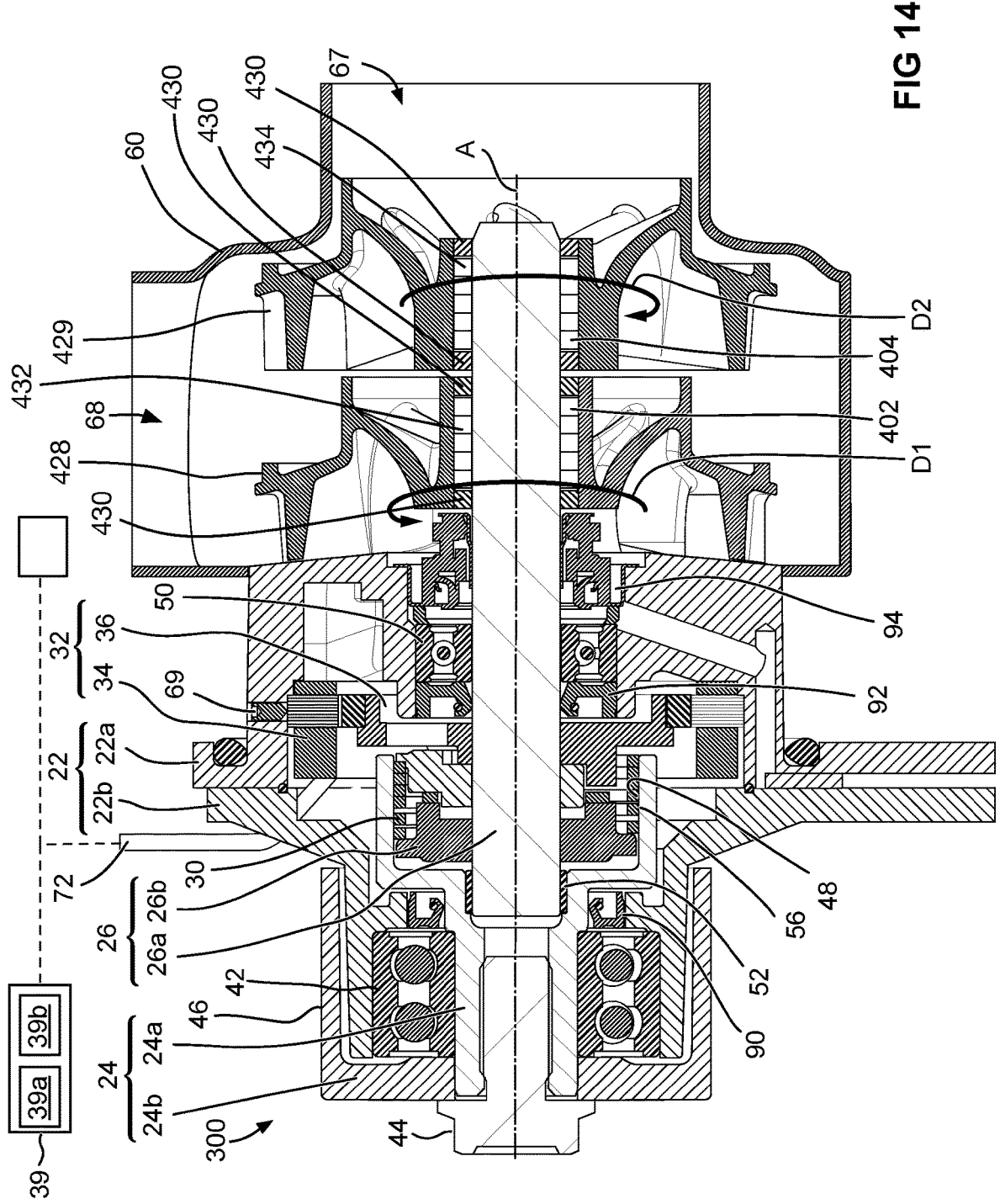
FIG. 14 is a sectional elevation view of the water pump shown in FIG. 1 with two impellers with individual clutches.

Reference is made to FIG. 14, which shows a water pump 400 that may be similar to the water pump 300 but which has first and second impellers 428 and 429 (which may be similar to impellers 328 and 339) which are mounted for rotation on the output shaft 26 via bearings 430 and first and second impeller one-way clutches 402 and 404. The clutches 432 and 434 may be any suitable type of clutch such as wrap spring clutches, roller clutches, sprag clutches, or any other suitable types of clutch. The clutch 402 is configured to transfer torque from the output shaft 26a to the impeller 428 during rotation of the shaft 26a in the first rotational direction D1, and to disengage and prevent torque transfer from the output shaft 26a to the impeller 428 during rotation of the shaft 26a in the second rotational direction D2. The clutch 404 is configured to transfer torque from the output shaft 26a to the impeller 429 during rotation of the shaft 26a in the second rotational direction D2, and to disengage and prevent torque transfer from the output shaft 26a to the impeller 429 during rotation of the output shaft 26a in the second rotational direction D1. As a result, when the belt 14 (FIG. 1) causes rotation of the output shaft 26a in the first rotational direction, the first impeller 428 (FIG. 14) is driven by the output shaft 26a via the first one-way clutch 402, while the second impeller 429 is not driven to rotate due to the presence of the second one-way clutch 404. When the motor 32 (FIG. 1) causes rotation of the output shaft 26a in the second rotational direction, the second impeller 429 (FIG. 14) is driven by the output shaft 26a via the second one-way clutch 404, while the first impeller 428 is not driven to rotate due to the presence of the second one-way clutch 402.

While a clutch is shown for each impeller 428 and 429, it is alternatively possible to only provide the clutch 404 on the second impeller 429 and to fix the first impeller 428 to the output member 26. This reduces the complexity of the water pump 400, while providing the majority of the benefit of clutching the individual impellers, since the output member 26 is contemplated to be driven in the first rotational direction D1 for more time than it will be driven in the second rotational direction D2, in many vehicular applications.

Those skilled in the art will understand that a variety of modifications may be effected to the embodiments described herein without departing from the scope of the appended claims.

The invention claimed is:

1. A clutched device for association with an engine, comprising:
   an input member that is rotatable via an endless drive member that is driven by the engine;
   an output member;
   a wrap spring clutch that can operatively connect the input member to the output member; and
   a rotary motor including a stator and a rotor, wherein the rotor is connected for rotation with a portion of the wrap spring clutch, wherein the stator is operable to apply a first magnetic driving force to drive rotary movement of the rotor, which in turn drives rotary movement of the portion of the wrap spring clutch in a first rotational direction to increase a force of engagement between the input and output members, wherein the stator is operable to apply a second magnetic driving force to cause movement of the portion of the wrap spring clutch to disengage the input and output members from each other.

2. A clutched device as claimed in claim 1, wherein the second magnetic driving force is zero.

3. A clutched device as claimed in claim 1, wherein the second magnetic driving force is a braking force on the rotor.

4. A clutched device as claimed in claim 1, wherein the output member is connected to a water pump impeller and wherein the water pump impeller is driven in the first rotational direction when the input member drives the output member via the wrap spring clutch, and wherein the stator is operable to apply a third magnetic driving force to drive movement of the rotor in a second rotational direction, which maintains disengagement of the input member from the output member, wherein the rotor is operatively connected to the output member so as to drive the water pump impeller in the second rotational direction when the stator is operated to apply the third magnetic driving force.

5. A clutched device as claimed in claim 4, wherein the rotor has at least one lug thereon that is engageable with at least one lug on the output member during rotation of the rotor in the second rotational direction.

6. A clutched device as claimed claim 1, wherein the wrap spring clutch has a first end that is engaged with the output member, a radially outer surface that is engageable with the input member, and a second end that is engaged by the rotor.

7. A clutched device as claimed in claim 4, wherein the water pump impeller is configured to pump water through the engine in a first fluid flow direction when driven in the second rotational direction and is configured to pump water through the engine in in a first fluid flow direction when driven in the second rotational direction.

8. A clutched device as claimed in claim 7, wherein the water pump impeller includes an axial flow portion and a radial flow portion.

9. A clutched device as claimed in claim 8, further comprising a water pump housing, wherein the water pump impeller has an axis of rotation and wherein the water pump housing has a first port that is arranged along the axis of rotation and a second port that is arranged along a radial edge of the water pump housing.

10. A clutched device as claimed in claim 9, wherein the water pump impeller is configured to drive flow from the first port to the second port when the water pump impeller rotates in the first rotational direction and is configured to drive flow from the second port to the first port when the water pump impeller rotates in the second rotational direction.

11. A clutched device as claimed in claim 9, wherein the stator is arranged radially outside the rotor.

12. A clutched device as claimed in claim 1, wherein the output member is connected to a first water pump impeller and to a second water pump impeller, wherein the first water pump impeller is configured to drive coolant flow in a first fluid flow direction when the output shaft is rotated in the first rotational direction and the second water pump impeller is configured to drive coolant flow in a second fluid flow direction when the output shaft is rotated in a second rotational direction, and wherein the output member is driven in the first rotational direction when the input member drives the output member via the wrap spring clutch, and wherein the stator is operable to apply a third magnetic driving force to drive movement of the rotor in the second rotational direction, which maintains disengagement of the input member from the output member, wherein the rotor is operatively connected to the output member so as to drive the water pump impeller in the second rotational direction when the stator is operated to apply the third magnetic driving force.

\* \* \* \* \*